United States Patent [19]
Inniss et al.

[11] Patent Number: 5,528,716
[45] Date of Patent: Jun. 18, 1996

[54] METHOD OF DETERMINING AND INVESTIGATING THE PHYSICAL STRUCTURE OF A LIGHT GUIDING BODY

[75] Inventors: Daryl Inniss, Hillsborough; Ashish M. Vengsarkar, Chatham; Qian Zhong, Scotch Plains, all of N.J.

[73] Assignee: AT&T Corp., Murray Hill, N.J.

[21] Appl. No.: 400,892

[22] Filed: Mar. 8, 1995

Related U.S. Application Data

[62] Division of Ser. No. 198,802, Feb. 17, 1994.

[51] Int. Cl.⁶ .............................. G02B 6/02; G01N 21/00
[52] U.S. Cl. ................. 385/123; 385/37; 385/39; 385/147; 385/38; 356/73.1
[58] Field of Search .................. 385/31, 37, 38, 385/39, 123, 125, 126, 129, 130, 131, 147; 356/73.1

[56] References Cited

U.S. PATENT DOCUMENTS

| | | | |
|---|---|---|---|
| 4,662,743 | 5/1987 | Nishimura et al. | 356/73.1 |
| 4,779,978 | 10/1988 | Hatton et al. | 356/73.1 |
| 4,854,701 | 8/1989 | Noll et al. | 356/73.1 |
| 4,934,818 | 6/1990 | Glantschnig et al. | 356/73.1 |
| 5,042,943 | 8/1991 | Mallinson et al. | 356/73.1 |
| 5,090,018 | 2/1992 | Murphy et al. | 356/73.1 X |
| 5,216,739 | 6/1993 | Hill et al. | 385/123 |
| 5,365,329 | 11/1994 | Svendsen | 356/73.1 |
| 5,377,288 | 12/1994 | Kashyap et al. | 385/37 |
| 5,388,173 | 2/1995 | Glenn | 385/37 |

OTHER PUBLICATIONS

"Atomic force microscopy study of uv–induced anisotrophy in hydrogen–loaded germanosilicate fibers", Inniss, D., et al., *Appl. Phys. Lett.* 65, pp. 1528–1530, Sep. 1994.

"Photoinduced birefringence in optical fibers: a comparative study of low–birefringence and high–birefringence fibers", Bardal, S., et al., *Optics Letters*, pp. 411–413, Mar. 15, 1992.

"Proprietes de polarisation de reflecteurs de Bragg induits par photosensibilite dans les fibres optiqures monomodes", Parent, M., et al., *Applied Optics*, vol. 24, No. 3, pp. 354–357, Feb. 1, 1985.

"High Pressure $H_2$ Loading As A Technique For Achieving Ultrahigh UV Photosensitivity And Thermal Sensitivity in $GeO_2$ Doped Optical Fibres", Lemaitre, P. J., et al., *Electronics Letters*, vol. 29, No. 13, pp. 1191–1193, Jun. 24, 1993.

"Birefringent Photosensitivity In Monomode Optical Fibre: Application To External Writing Of Rocking Filters", *Electronics Letters*, vol. 27, No. 17, pp. 1548–1550, Aug. 15, 1991.

*Primary Examiner*—Brian Healy

[57] ABSTRACT

A method of controlling the polarization properties of a photo-induced device in an optical waveguide and a method of investigating the structure of a light guiding body such as an optical waveguide are disclosed. A device, such as gratings, is written by exposing one side of the optical waveguide to light. The unexposed side is then exposed to an amount of light sufficient to impart the desired birefringence to the written device. The birefringence can be minimized in the written device by exposing the opposite side to light in an amount sufficient to minimize the amount of birefringence. The light guiding body is investigated by cleaving the elongated light guiding body, such as an optical waveguide, to expose its cross-section. The cleaved section is then treated to expose difference between the core and cladding. Treatment may include etching in an acid or base. The cross-section is then profiled with a scanning probe microscope such as an atomic force microscope to investigate the structure of the light guiding body. The difference in refractive index can be determined across the cleaved endface based on differences in the etched depth.

14 Claims, 12 Drawing Sheets

METHOD OF DETERMINING AND INVESTIGATING THE PHYSICAL STRUCTURE OF A LIGHT GUIDING BODY

This is a divisional of co-pending application Ser. No. 08/198,802 filed Feb. 17, 1994, pending.

FIELD OF THE INVENTION

This invention relates to a method of controlling the polarization properties of a photo induced-device in an optical waveguide and a method of investigating the structure of optical waveguides by profiling the cross-section of a treated waveguide.

BACKGROUND OF THE INVENTION

The refractive index of optical waveguides can be increased by exposing the waveguide to a light source. Typically, these devices are produced by 1) irradiating the fibers from the side with ultraviolet or infrared radiation, or 2) in some devices, launching visible light to the fiber core in a predetermined manner. These photo-induced devices (referred to as gratings hereafter) help create a structure similar to a filter for multiplexing and demultiplexing different wavelengths and controlling wave propagation through the waveguide. The refractive index changes can be increased even more by "loading" the fibers with molecular hydrogen.

Typically, these gratings are a periodic structure of refractive index changes within the fiber or waveguide and are preferably formed by exposing one side of the optical waveguide to a light source so that a small section has a refractive index rise. For example, a coherent light beam from an ultraviolet source could be split into two parts and then recombined to form an interference pattern. The interference pattern with fringes of light and dark spots can be impinged upon the waveguide to form the desired grating.

It has been observed that the side-exposure of fiber with a light to form the index changes contributed to anisotropy in the waveguide. Until the present invention, it was not known what contributed to anisotropy. Some researchers proposed that stress contributed to the anisotropy since birefringence decreases upon heating or prolonged ultraviolet exposure. With earlier designed optical waveguide communication systems, any birefringence such as caused by writing the photo-induced gratings was at most minimal to the overall operation. However, technological advances in telecommunications and signal propagation will make the birefringence effect unacceptable. Anisotropy can cause dispersion within the fiber and small changes in wavelength propagation of just a few hundreds of a nanometer. In future, more advanced systems, these slight changes could correspond to a different communication channel in a multiplexed, multichannel system.

A critical issue in evaluating waveguide performance is the ability to investigate the light guiding structure within the waveguide, i.e., the physical, chemical, and optical characteristics of the core region where most of the light travels. Therefore, it would also be desirable to study the waveguide's endface (cross-section) to investigate and determine changes in the refractive index of the optical waveguide to further enhance research, development, and manufacturing of waveguides for future use.

SUMMARY OF THE INVENTION

The method of the present invention controls the polarization properties of a photo-induced device in an optical waveguide by imparting the desired birefringence to the written device. In accordance with the present invention, the structure of optical waveguides can also be investigated in an exact manner to determine and investigate the structure of light guiding bodies also known as optical waveguides, such as optical fibers. In accordance with the present invention the photo-induced devices, such as gratings, are written to the light guiding body by exposing one side of the fiber or waveguide to light. The unexposed side is then exposed to light in an amount sufficient to impart the desired birefringence to the written device. In this manner, gratings are formed in the waveguide. Typically, a cladding surrounds the core and has an index of refraction less than that of the waveguide core. With the system of the present invention, a photo-induced birefringence of less than 0.000005 has been obtained.

In accordance with the present invention, the structure of the optical waveguide is investigated to determine i) the changes in refractive index across the device, ii) the ovality of the fiber core, and iii) the core dimensions.

In one aspect of the invention, the elongated light guiding body forming the optical waveguide is cleaved to expose its cross-section. The cleaved section is then treated to expose differences between the core and cladding. The cross-section of the treated body is profiled with a scanning probe microscope, such as an atomic force microscope, to investigate the structure of the optical waveguide. In one aspect of the invention, the treating step includes etching the cleaved end of the waveguide in an acid or a base. Spatial mapping of the endface can be quantified with the etched depth in relation to any refractive index changes.

DESCRIPTION OF DRAWINGS

The foregoing advantages of the present invention will be appreciated more fully from the following description, with reference to the accompanying drawings in which.

DETAILED DESCRIPTION OF THE INVENTION

The present invention offers the advantage of controlling the polarization properties of a photo-induced device in an optical waveguide. Additionally, in another aspect of the present invention, the structure of a light guiding body, can be investigated now by cleaving the elongated waveguide to expose its cross-section, and then treating the cleaved section (such as by hydrofluoric acid etching) to expose differences between the core and cladding, and then studying the cross section with a scanning probe microscope such as an atomic force microscope. The cross-section is then profiled with the atomic force microscope to investigate the structure of the waveguide.

It is through the use of the method of the present invention that it was determined that the refractive index of ultraviolet exposed fibers was anisotropic and that the birefringence increased after an initial ultraviolet exposure, but decreased after a 180° azimuthal rotation followed by ultraviolet exposure.

Figure 4:
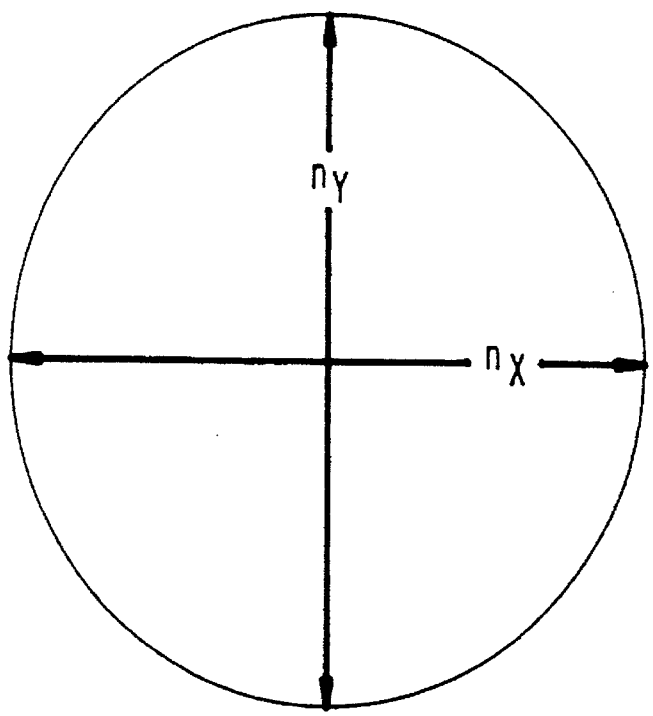
FIG. 4 is a schematic representation showing the effect created by birefringence in an optical waveguide.
Figure 5:
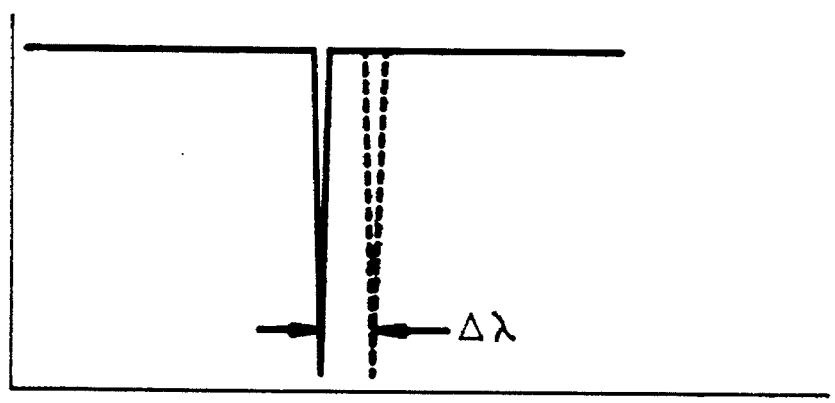
FIG. 5 is a graph depicting the slight offset in the signal wavelength which can occur by birefringence within the waveguide.

This discovery has now allowed the use of another aspect of the present invention for controlling these polarization properties of photo-induced devices in optical waveguides. This is advantageous over the prior art waveguides and fibers which suffered birefringence (shown schematically in FIG. 4) and could create differences in polarization properties of the fiber in its cross-section. As exemplified in the graph of FIG. 5, the birefringence in the fiber could create a slight shift in the wavelength which in advanced high speed telecommunication applications, could correspond to undesirable changes in channel.

For purposes of explanation, the method of controlling the polarization properties in optical waveguides will be described first, followed by a general description of the method for investigating the structure of these waveguides. Throughout the description, the waveguides will be referred to as fibers, or in some instances waveguides. Naturally, the waveguides could be different forms such as planar waveguides or optical fibers.

Figure 2:
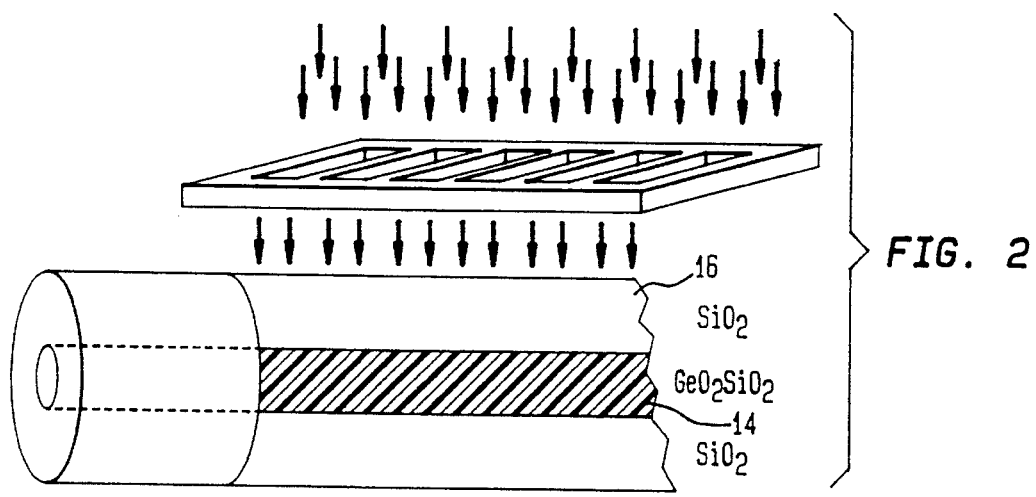
FIG. 2 is a general schematic view of a fiber optic waveguide and phase plate used for writing the device.
Figure 3:
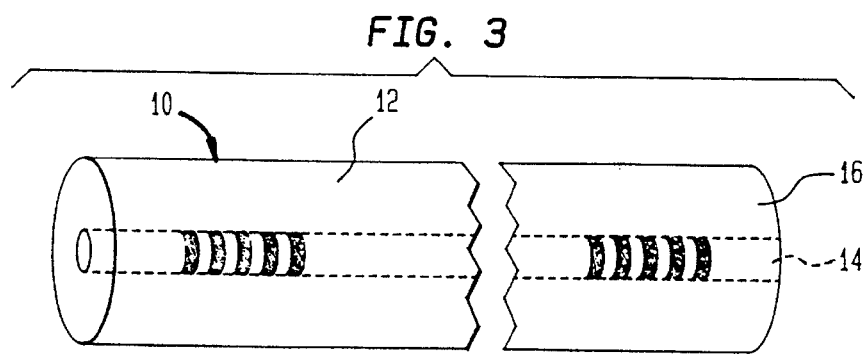
FIG. 3 is a general schematic view of a grating formed within the fiber optic waveguide.

Typically, the photo-induced devices are formed by exposing one side of the fiber 10 to an ultraviolet or infrared light to form gratings 12 within the fiber as shown in FIGS. 2 and 3. Hereinafter, the method will be described relative to forming gratings with ultraviolet light.

The fiber 10 is typically a silica based fiber with a germanium doped core 14 and silica cladding 16. FIG. 2 schematically illustrates a phase mask 18 used to help write the gratings. In one embodiment, when gratings are written by ultraviolet exposure, they are about five millimeters long with periodicities of about 0.5 um. The diameter of the fiber core in that embodiment is less than about 10 um.

In accordance with the method of the present invention described in detail below, it has been determined that the etched depth in the center region of the ultravioletly exposed fibers is comparable to that of a standard fiber, but the etched depth is asymmetrical. The depth is largest at the core-cladding interface on the side of the incident radiation. The refractive index is also anisotropic and largest at the core-cladding interface on the side of the incident ultraviolet radiation.

Figure 1:
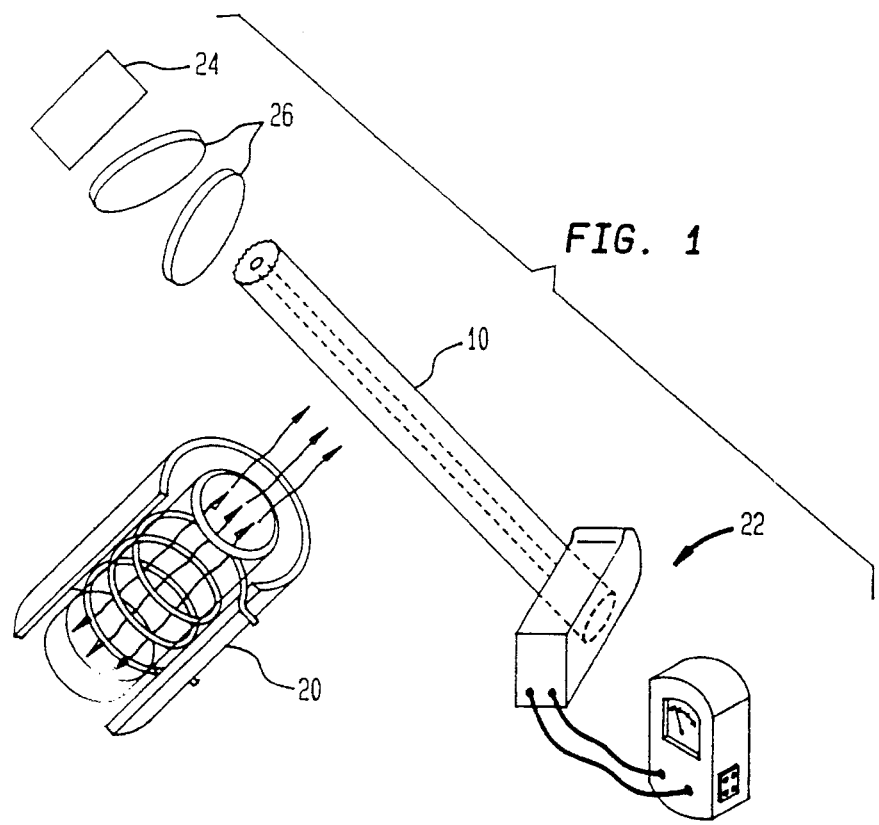
FIG. 1 is a general schematic view showing a mechanism for writing the photo-induced devices and for analyzing polarization.

Referring now to FIG. 1, there is illustrated a general schematic of an apparatus and method which writes gratings onto a fiber waveguide 10. An ultraviolet or infrared laser 20 is used to write the gratings. In accordance with the present invention, the fiber 10 is rotated at least 180° by suitable mechanical means (not shown in detail) to prevent the birefringence. A polarization analyzer 22 can verify the birefringence after light emitted from a 1.53 μm source 24 is transmitted through polarizers 26 into the fiber.

Figure 7A:
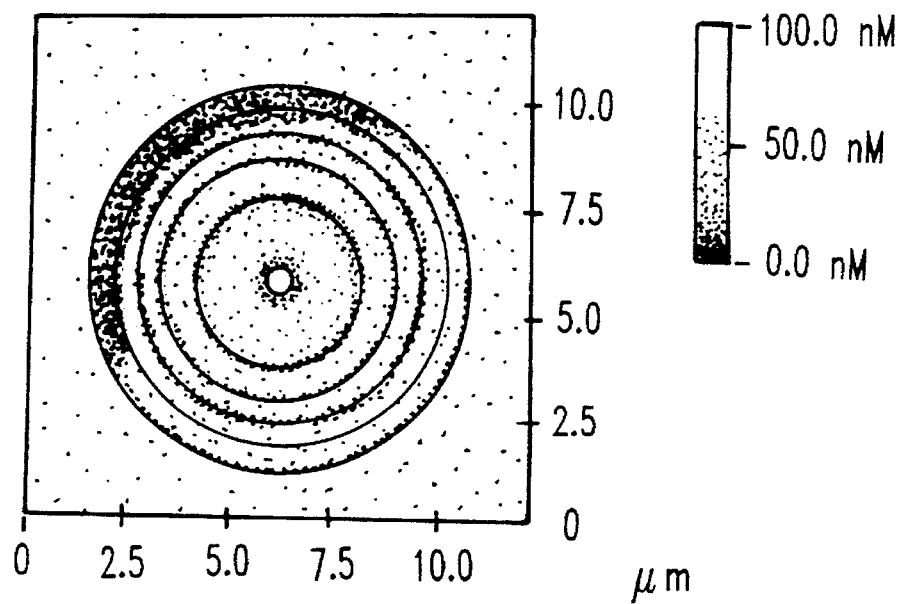
FIG. 7A is an atomic force microscope image of the cleaved end of an optical fiber when the fiber has been ultravioletly irradiated on one side.

FIG. 7A shows a prior art optical waveguide which has been investigated with the method of the present invention. The drawing shows a darkened area on the side of the fiber which had been exposed to the incident ultraviolet radiation. As shown in FIG. 7A, the core-cladding interface is deeper on one side than on the other (i.e., 45 vs. 20 nm).

Figure 6A:
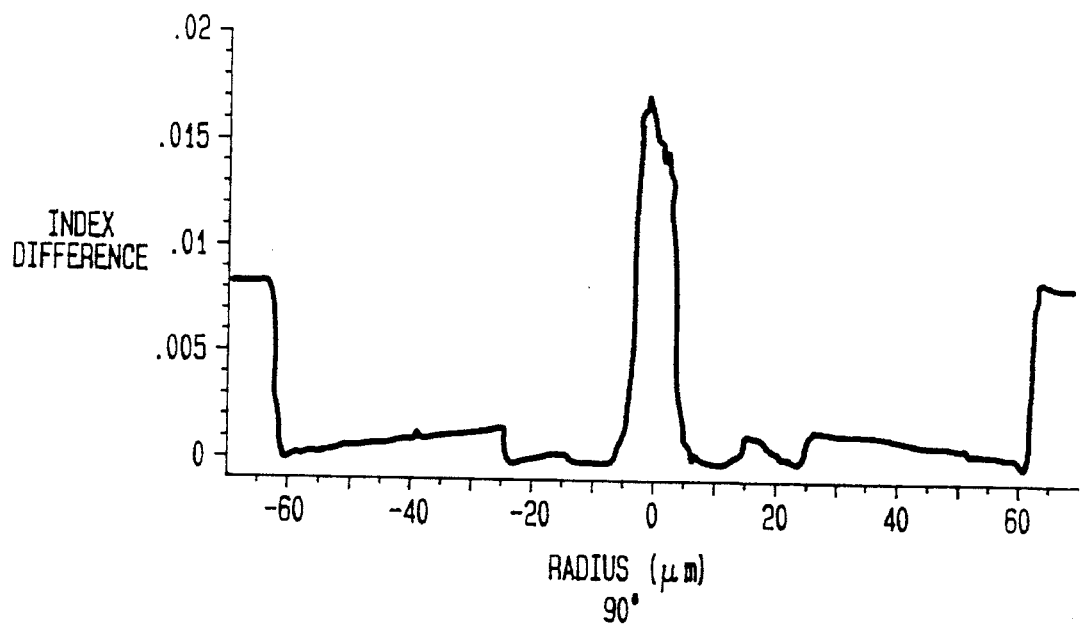
FIGS. 6A and 6B are refractive index profiles of an ultraviolet irradiated fiber after irradiation on one side.
Figure 6B:
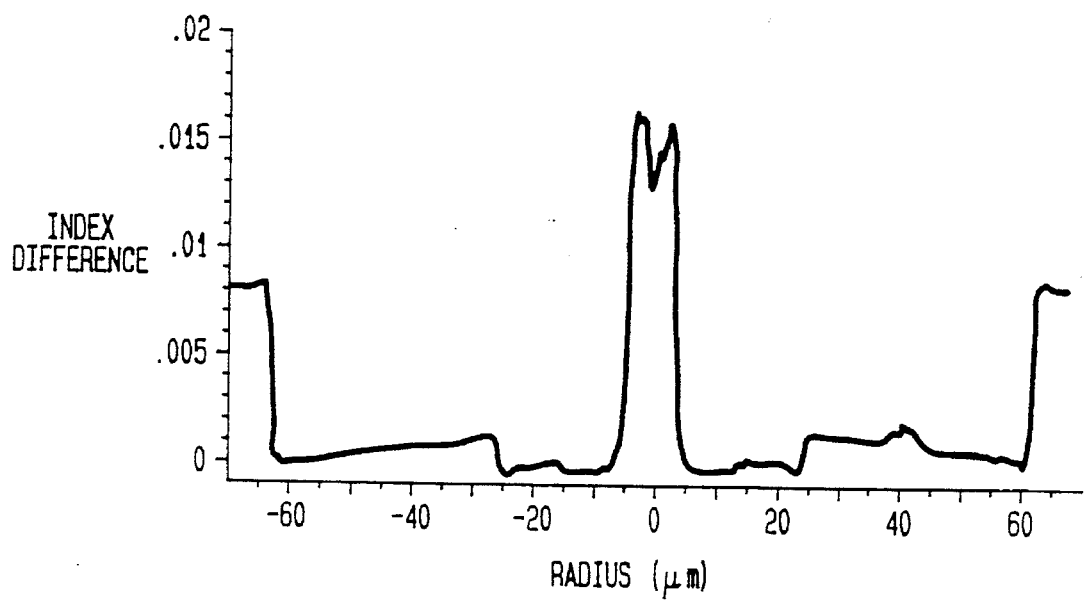

Referring now to FIGS. 6A and 6B, a series of graphs of the refractive index profile of the fiber shown in FIG. 7A are illustrated. The fiber has been profiled at planes rotated 90° azimuthally about its axis. Anisotropy is also evident in the refractive index profile where the largest index change coincides with the largest etch rate. The largest and smallest refractive index changes are observed at the core-cladding interface.

Similar to the indexed profile, a plane where the index is approximately isotropic is observed in FIG. 6B. Since this is a unique orientation, the direction of the incident uv radiation can be determined. The uv sources should be incident at a 90° azimuthal rotation from the isotropic orientation (i.e., see FIG. 7A). Profiling the refractive index differences of the fiber which is uv-exposed, rotated by 180° and again uv exposed (i.e., the sample shown in FIG. 7B) illustrates that the largest refractive index change coincides with the section exhibiting the deepest etch (i.e., at the core-cladding interface). These observations suggest that the largest refractive index change in FIG. 6A nearly coincides with the incident uv radiation.

Anisotropy in the refractive index is also observed for a fiber with the 0.5 um period gratings. The lowest refractive index is higher than that of the unexposed fiber, suggesting that the exposed section is not at the index change boundary—as suggested earlier—or that there is an increase in the index, even in sections not exposed to the uv source.

Figure 7B:
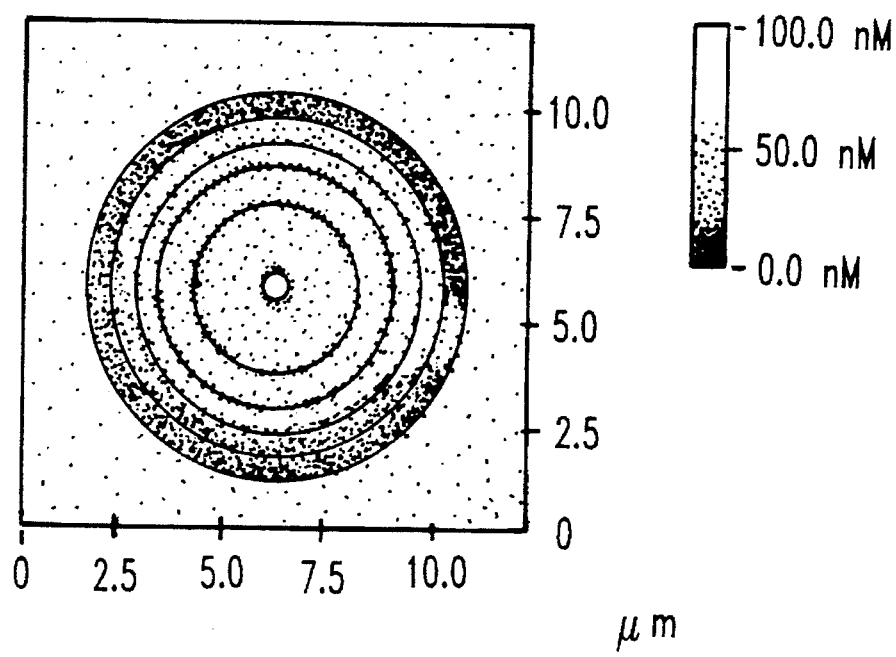
FIG. 7B is the fiber of FIG. 7A which has been irradiated on both sides.
Figure 13:
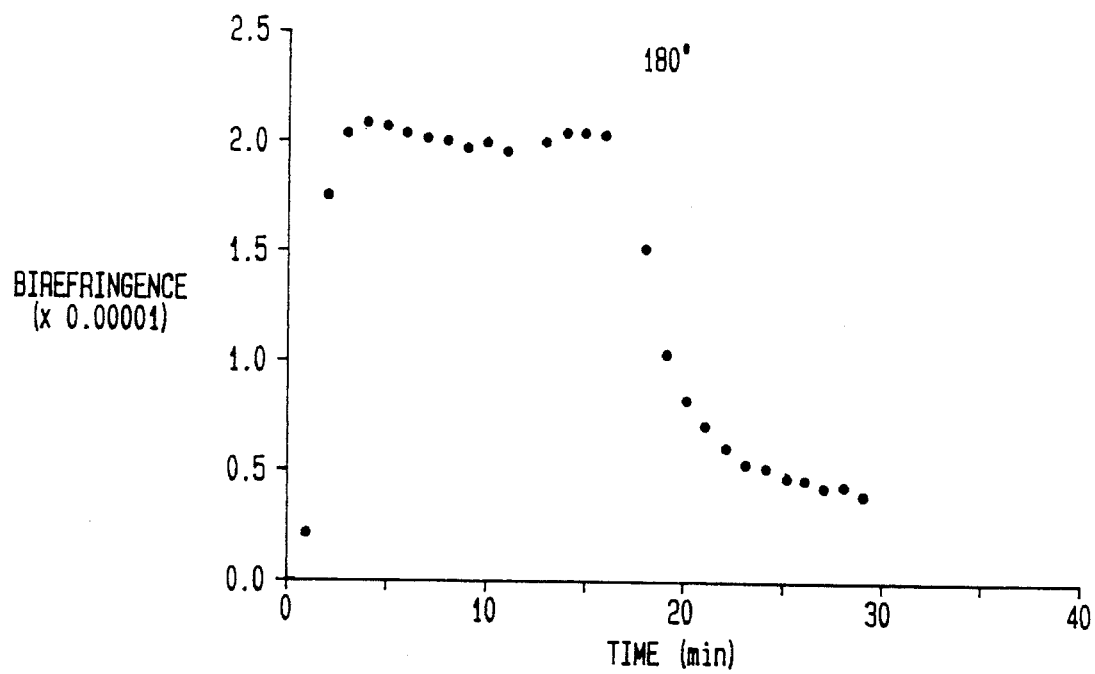
FIG. 13 is a chart showing the reduction in birefringence when the fiber is rotated 180° and then exposed again.

FIG. 7B shows the fiber in accordance with the present invention which has been exposed to ultraviolet radiation so that birefringence is controlled. As shown in the drawing, the darkened areas extend along both sides of the fiber illustrate that birefringence has decreased after the 180 degree azimuthal rotation followed by the ultraviolet exposure. FIG. 13 shows a plot illustrating the reduction in birefringence when the fiber is rotated and the exposed.

Referring now to FIGS. 8 through 12, various mechanisms for controlling the polarization properties of a photoinduced device when it is written in an optical waveguide are disclosed.

Figure 8A:
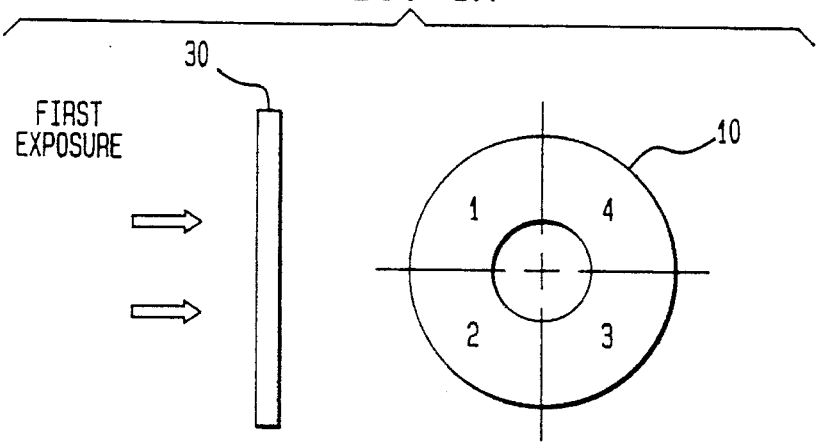
FIGS. 8A and 8B show a method for exposing first one side and then the opposite side with ultraviolet radiation for controlling polarization properties of the fiber.
Figure 8B:
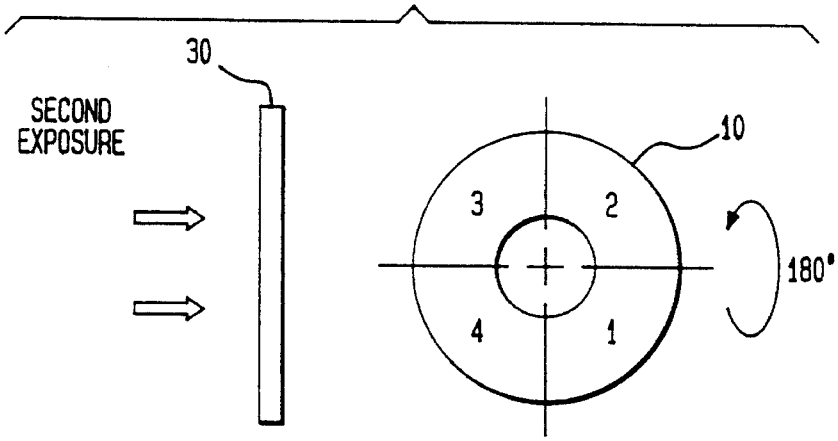

FIG. 8A shows ultraviolet radiation directed through a phase mask against the fiber which is oriented so that one side is exposed to the ultraviolet radiation. The fiber then is held axially in place, and then rotated 180 degrees (FIG. 8B) so that the opposite side is exposed to the ultraviolet radiation. The mask can also be a polarizer or one-fourth (¼) wavelength plate.

Figure 9:
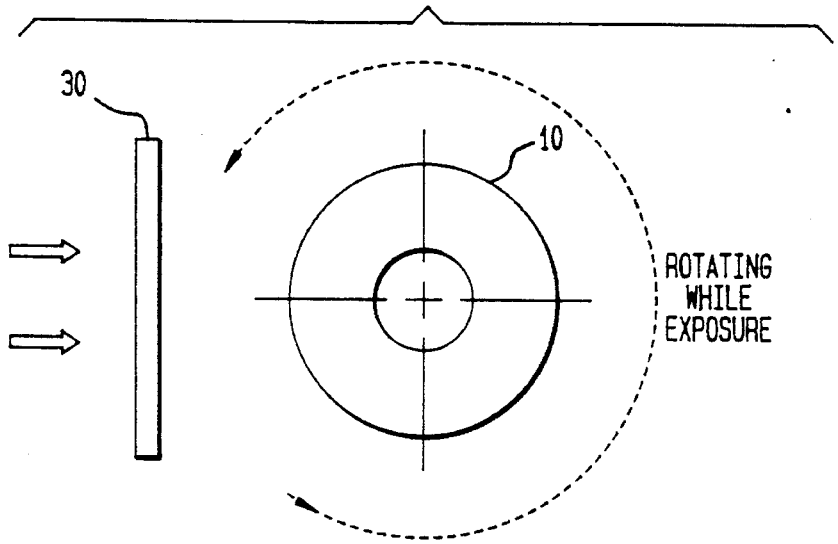
FIG. 9 shows a method of exposing the fiber while it rotates so as to control birefringence in the fiber.

FIG. 9 illustrates the method of controlling the polarization properties of a fiber by continuously rotating the fiber 10 during ultraviolet exposure through a mask 30 to form the gratings.

Figure 10:
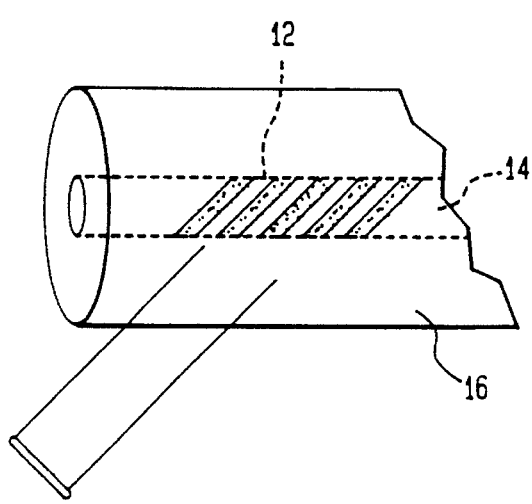
FIG. 10 shows use of a slit similar to a collimator, which is placed longitudinally along the fiber axis.

FIG. 10 illustrates a method where birefringence can be controlled by minimizing the area of the fiber core exposed to the ultraviolet source. A two μm slit 36 is placed longitudinally along the fiber axis, which then is exposed to UV radiation. Depending on the application and design one skilled in the art chooses, the position and width of the slit may be varied. In addition, the degree of fiber rotation azimuthally can be varied to obtain the desired birefringence.

Figure 11:
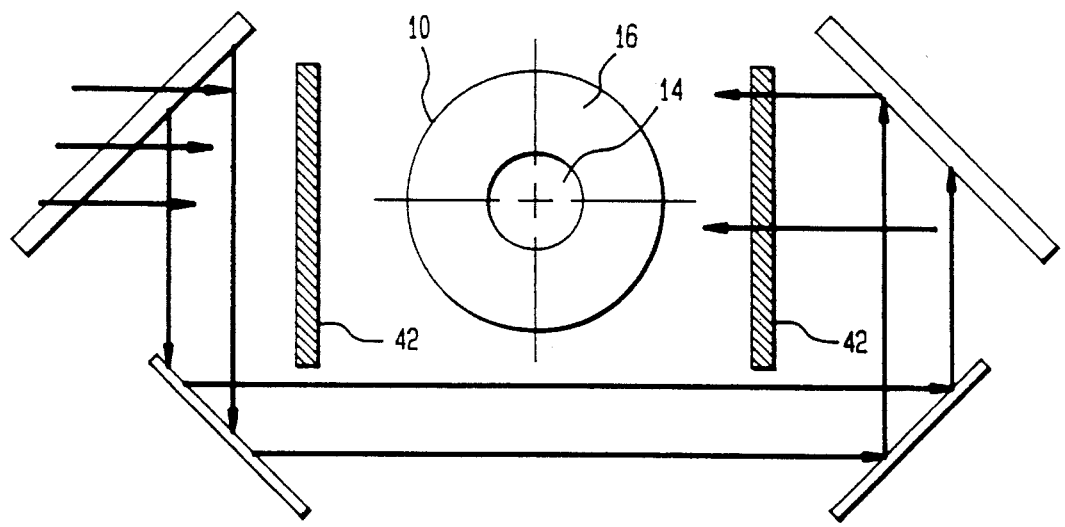
FIG. 11 is a schematic illustration of one system showing the position of phase masks and reflectors for exposing the fiber to ultraviolet radiation on both sides.

FIG. 11 depicts a device where mirrors 40 reflect the ultraviolet radiation through opposing phase masks 42 onto the fiber.

Figure 12:
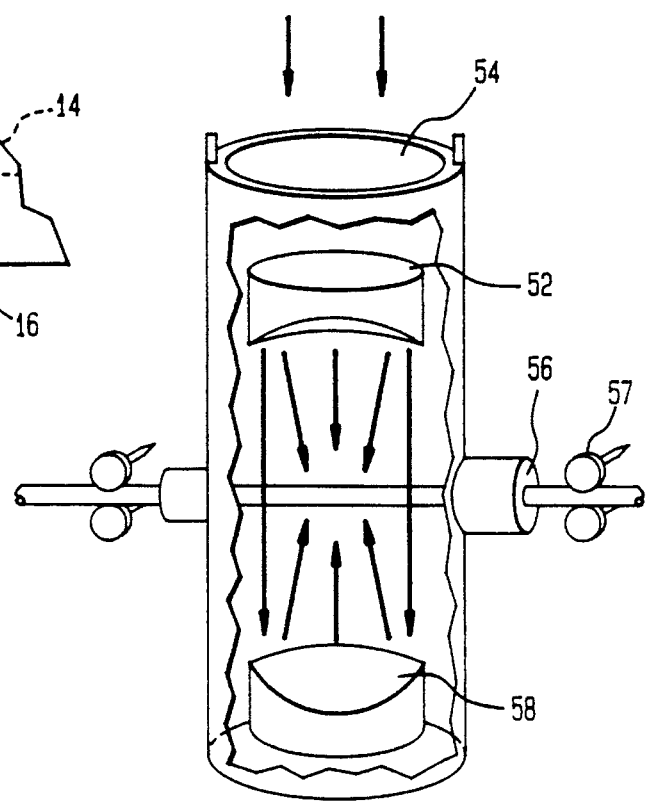
FIG. 12 shows a group of cylindrical/elliptical lenses which focus the ultraviolet radiation onto all sides of the fiber for exposure.

FIG. 12 illustrates a device where a pair of cylindrical/converging lenses focus the ultraviolet radiation concentrically around the fiber to expose the fiber and form the gratings. A housing 50 supports opposing conveying lenses. The first lens 52 is adjacent the housing opening 54 which allows ultraviolet light to enter. The light converges toward the fiber 10, which is moved axially through a guide entrance means 56 located at the side of the housing 50 by fiber advancement means 57. Some of the ultraviolet light is reflected off the second lens 58 and converges onto the fiber.

METHOD FOR INVESTIGATING FIBER STRUCTURE

In accordance with the method of the present invention, the structural aspects of the core and the geometrical distortions can be determined from the profiled cross section of the treated waveguide. By establishing a correlation between the refractive index change and etching topography, a scanning probe microscope can provide a 3-D mapping of the refractive index change in direct relation to the microstructural features on the fiber endface. In accordance with the method of the present invention, it is possible to apply this new method of investigation to numerous optical fiber waveguides by studying the light guiding structure.

In one aspect of the invention, the light guiding body forming the optical wave guide (an optical fiber in the illustrated examples) is cleaved to expose its cross section. The cleaved section is then treated such as by etching with hydrofluoric acid to expose the differences between the core and cladding. The cross section is then profiled with a scanning probe microscope, such as an atomic force microscope, to investigate the structure of the fiber by profiling the topography of the etched fiber end face.

The etching rate acts as a fingerprint to determine the effect of dopant chemistry and preform fabrication conditions on the fiber structure. The structural and geometrical distortions of the fiber are directly measured. Additionally, by quantifying the etched depth in relation to the refractive index change, a spatial mapping of the refractive index change can be inferred from the profile.

By the method of the present invention, the features of the light guiding structure which contribute to the performance of light transmission can now be studied on a nanometric scale by investigating the endface as compared to the prior art investigations where only the surface areas of the fibers were analyzed. Until the method of the present invention was used, studies on fibers have been hindered because of the limited spatial resolution of the techniques employed.

A scanning probe microscope can be used to profile a cross section of the fiber. In the disclosed embodiment, an atomic force microscope is used throughout the description. However, a scanning tunnelling microscope may also be used or a near-field scanning optical microscope.

The scanning probe microscope acts as local probe with subnanometer capability, with 3-D topographical information with high lateral resolution. Additionally, unambiguous height measurements with nanometric vertical resolution is available.

As will be shown below, the cleaved endface of a fiber is etched to enhance the light guiding structure, which then is profiled with the scanning probe microscope. The core can etch differentially from the cladding and thus the microstructure of the core can be readily analyzed. A correlation exists between etch depth of the core and the index of refraction for doped fibers. Based on this correlation, the spatial variation of the index refraction can be inferred from the etched topography.

Various telecommunication light guiding fibers were studied to demonstrate that fiber structure could be investigated with the method of the present invention. Initially, the polymer coating which normally covers the glass fiber was removed using a mechanical stripper followed by a clean wipe using, for example, isopropanol-soaked wiper paper, or by submerging the fiber in solvents methylene chloride, which causes the coating to delaminate. The bare fiber was subsequently cleaved. The quality of the as-cleaved surface can be examined using an interferometer to ensure a smooth endface. The cleavage angle was typically between 0.5° to 1° using such equipment.

It is possible that the cleaved fiber samples could be examined directly by an atomic force microscope. However, the freshly cleaved glass surface is electrostatically charged, and under ambient conditions, the surface is rapidly contaminated, which obstructs the underlying microstructure. It is more desirable, then, to etch the cleaved surface, which was the procedure followed below.

As an example, a hydrofluoric acid (HF), diluted to different concentration levels. The HF solution effectively removed the surface contaminants, and enhanced the microstructure, primarily through a higher etching rate of germanium dioxide than that of silica. The etched fiber had a nominal length of less that 1 mm and was mounted vertically in a fixture for examination using a scanning probe.

Figure 15:
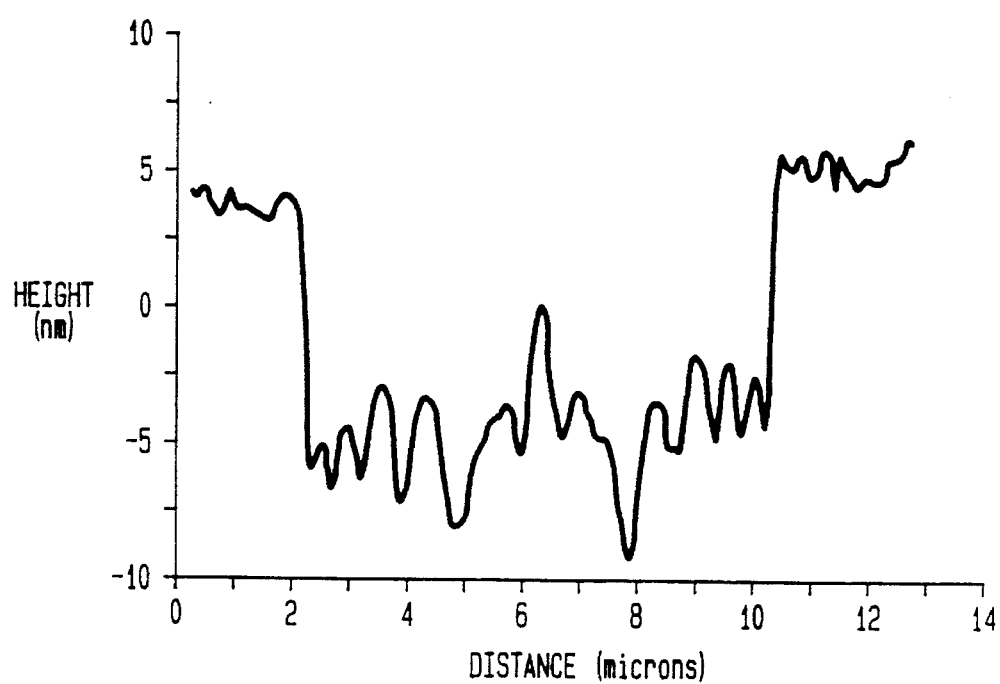
FIG. 15 is a 2-D depth image obtained directly from the digitized atomic force microscope image.
Figure 14:
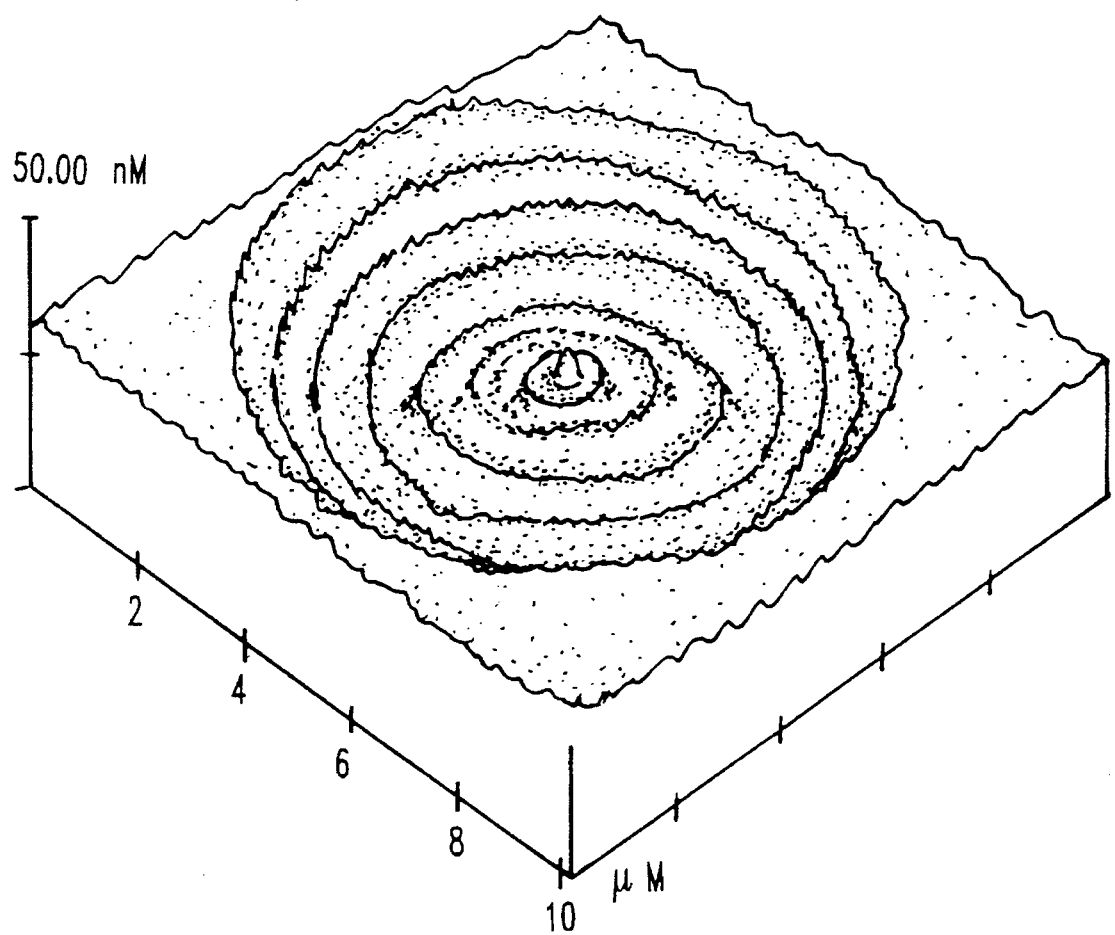
FIG. 14 is a 3-D surface topography of a fiber endface shown in the vertical height variation in the atomic force microscope image.
Figure 16:
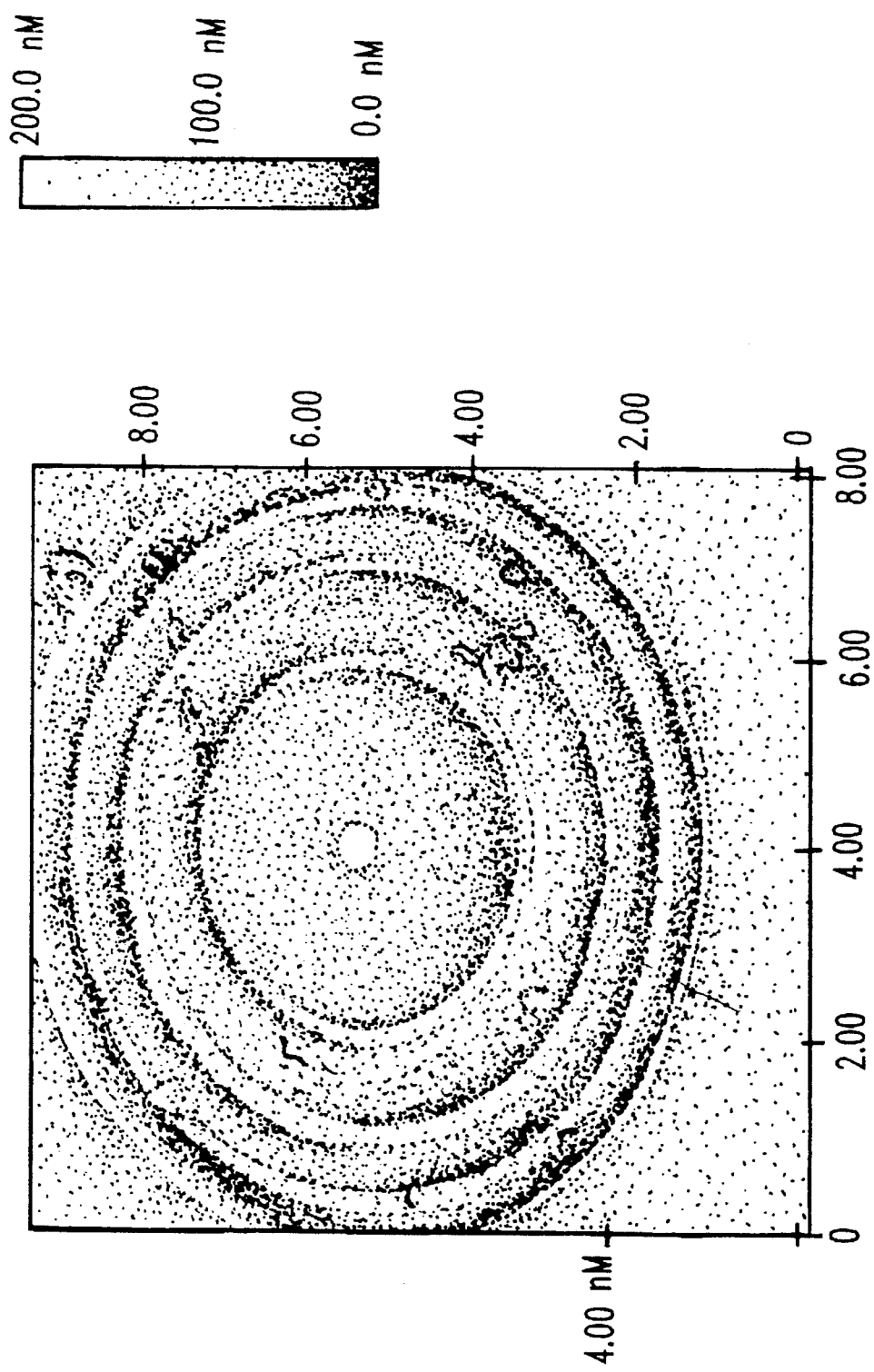
FIG. 16 is a fiber that has been etched with buffered oxide etch diluted with citric acid.

Results of the investigation on a germanosilicate fiber are exemplified by a 3-D surface of the endface in FIG. 14. The fiber was etched in 1% HF for 2.5 min. The vertical height variation in the AFM image was represented by a 256-level gray scale image as shown in FIG. 14. The white (or less dark) area represents the highest point in the imaged area, while the black region is the lowest point. A two-dimensional depth profile (FIG. 15) was obtained directly from the digitized AFM image.

As a measurement in the reproducibility and experimental errors associated with the etching/AFM profiling procedure at the fiber endface, different spools of the nominally identical fibers were profiled after a 2.5 minute etch in 1% of different batches of HF solution. A total of 20 sampling points (etch depths) for each fiber were measured at different locations of each deposited layer. The core diameter of each fiber was determined based upon four measurements along different directions to account for the geometrical asymmetry. Table 1 enumerates the measured mean depths and core diameters with their standard deviations from five different fiber samples. These data suggest that for a given etching condition, the etch process is highly reproducible and the etching depth represent a reliable parameter.

TABLE 1

| Sample ID | sample 1 | sample 2 | sample 3 | sample 4 | sample 5 |
| --- | --- | --- | --- | --- | --- |
| etching depth (nm) | 10.8 ± 0.2 | 10.9 ± 0.2 | 10.7 ± 0.2 | 9.8 ± 0.2 | 10.3 ± 0.2 |
| core diameter (μm) | 8.2 ± 0.2 | 8.3 ± 0.2 | 8.5 ± 0.2 | 8.2 ± 0.2 | 8.4 ± 0.2 |

Figure 17:
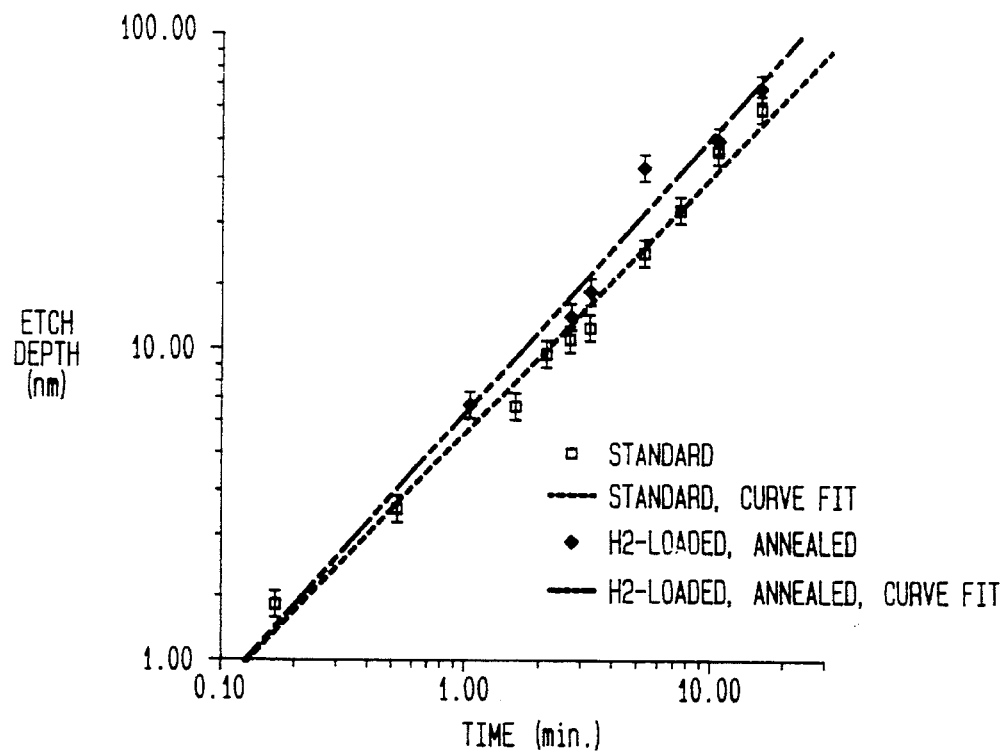
FIG. 17 shows a graph depicting the average etching depth as a function of etching time.

In addition to the measurement of the core diameter and etching depth, the etching rate per unit area, $dx/dt$, of a silica fiber (including doped silica) can be considered as, $dx/dt = k[C]^n$ where x is the etching depth, [C] is the etchant concentration, n is the reaction order, and k is the rate constant. For a dilute HF solution, the etching process is a first-order reaction. In the equation above n≈1. For a given [HF], $dx/dt$ is proportional to k. Based on experimental reaction kinetics, k is a function of an activation energy, which depends upon chemistry (e.g., different germanium contents) and processing (e.g., various stress levels in the fiber). The etching rate, $dx/dt$, therefore, can be used to characterize the effect of chemistry and processing on the light guiding structure. An example is illustrated in FIG. 17.

Figure 18:
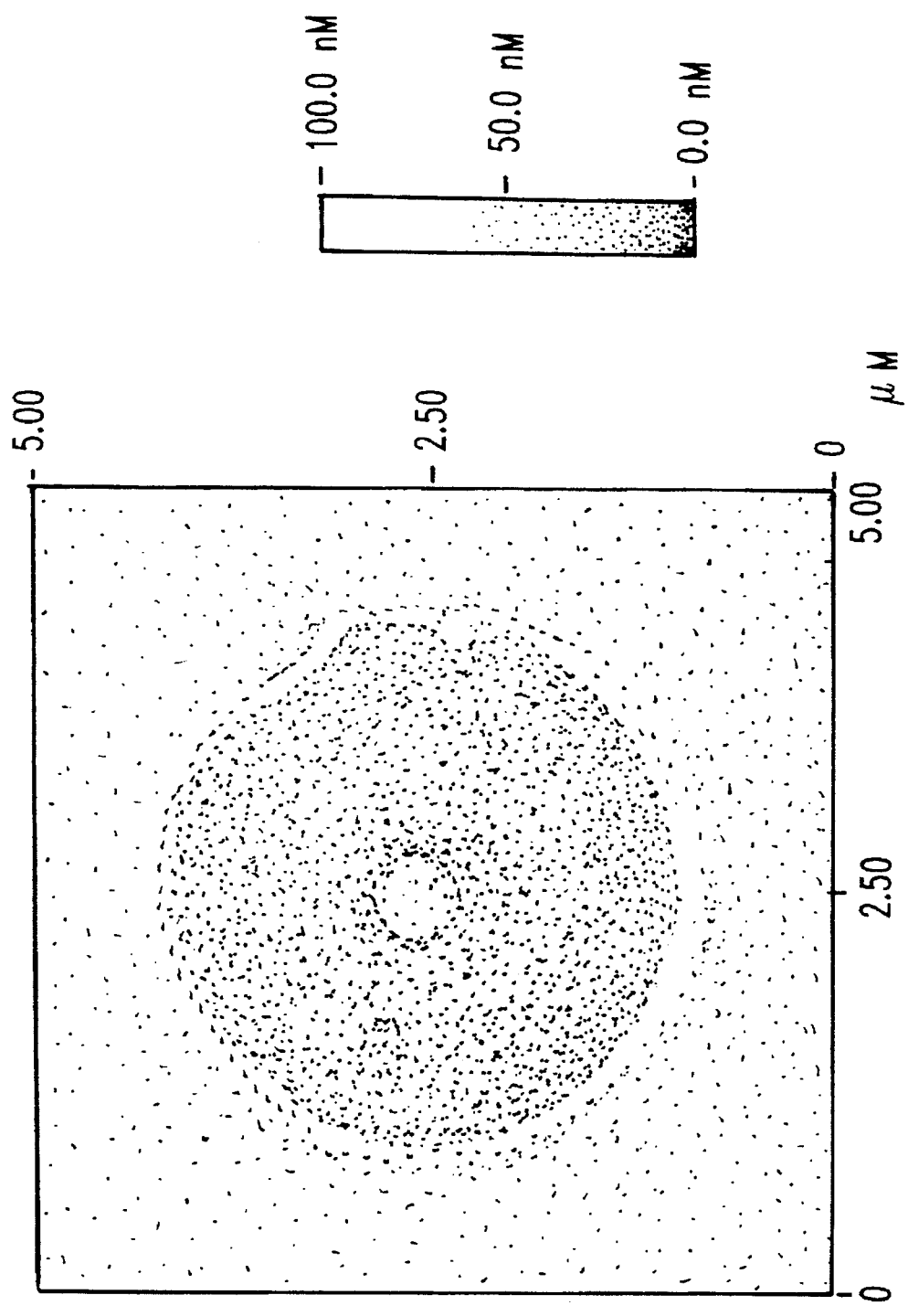
FIG. 18 is an atomic force microscope profile of a fiber showing severe distortion not only geometrically but structurally.
Figure 19:
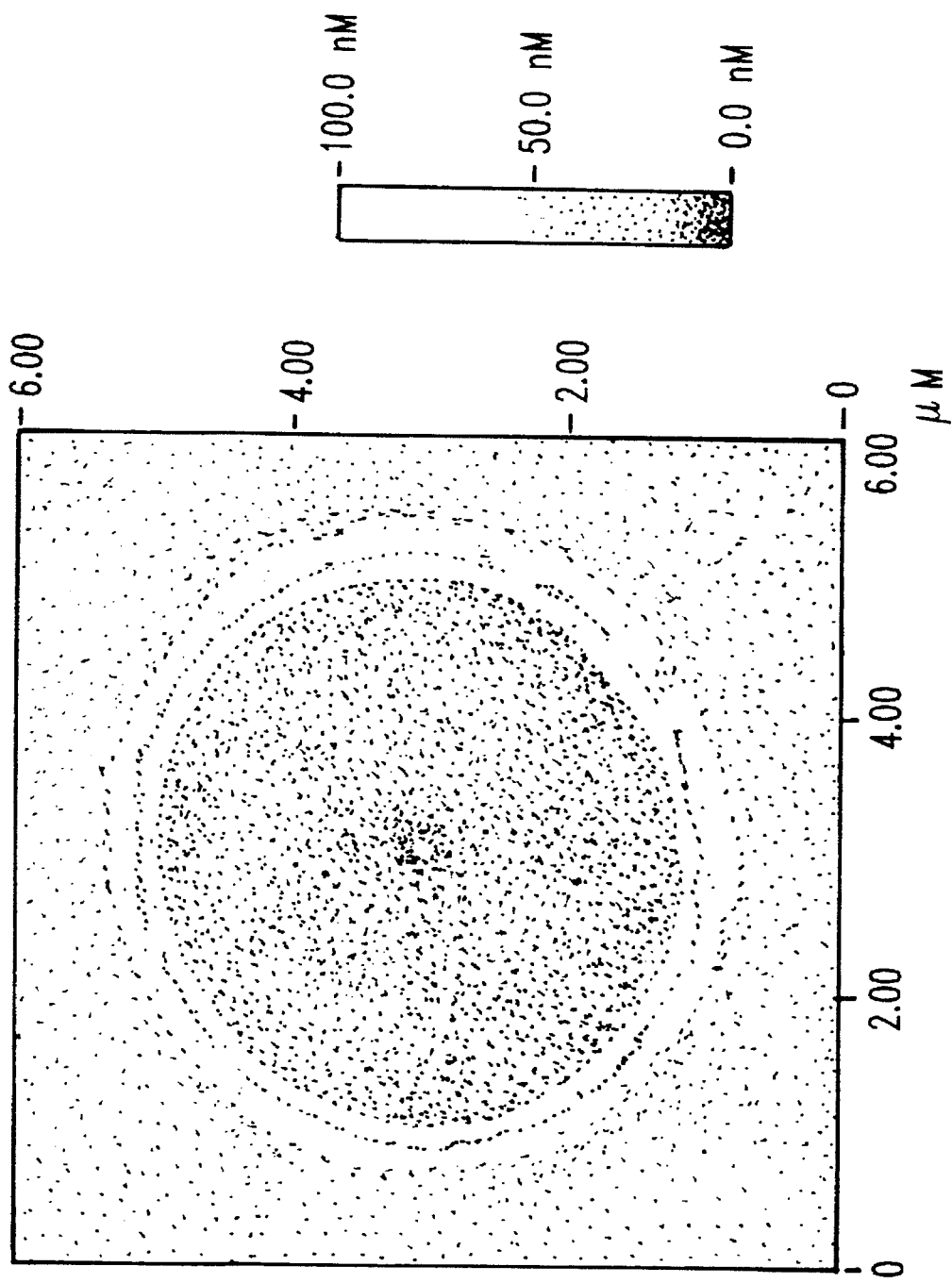
FIG. 19 is another atomic force microscope of a fiber showing a small degree of ovality.

Ovality of the core (elliptical asymmetry) is a critical parameter affecting transmission performance. The method of the present invention provides a reliable assessment of the core ovality to identify factors that may contribute to the fiber core distortion. FIGS. 18 and 19 compare two different fibers with varying ovalities. FIG. 18 illustrates a case of severe distortion, not only geometrically, but structurally, while the fiber shown in FIG. 19 exhibits a small degree of ovality. Therefore, examination of the fiber endface with a scanning force microscope is a convenient and feasible method to characterize the fiber core ovality.

As evident, the depth profile obtained with the method of present invention is correlated with the refractive index profile, within the core. The index change increases between each deposited layer. The maximum is in the etch depth. The raised index (the change of the refractive index) $\Delta n = n_{core} - n_{cladding}$, is defined as the refractive index difference between the core and the cladding. The raised index is attributed to for example dopants, such as germanium dioxide.

Since germanium etches faster in HF than silica, the index difference is expected to be proportional to the etching depth. Various germanosilicate fibers with different doping concentrations were etched in 1% HF for 2.5 minutes. The measured etching depth of each fiber sample as determined by the maximum etching depth within the core is compared to the maximum index change ($\Delta n$) in the corresponding region as determined from the index profile of that fiber.

Figure 20:
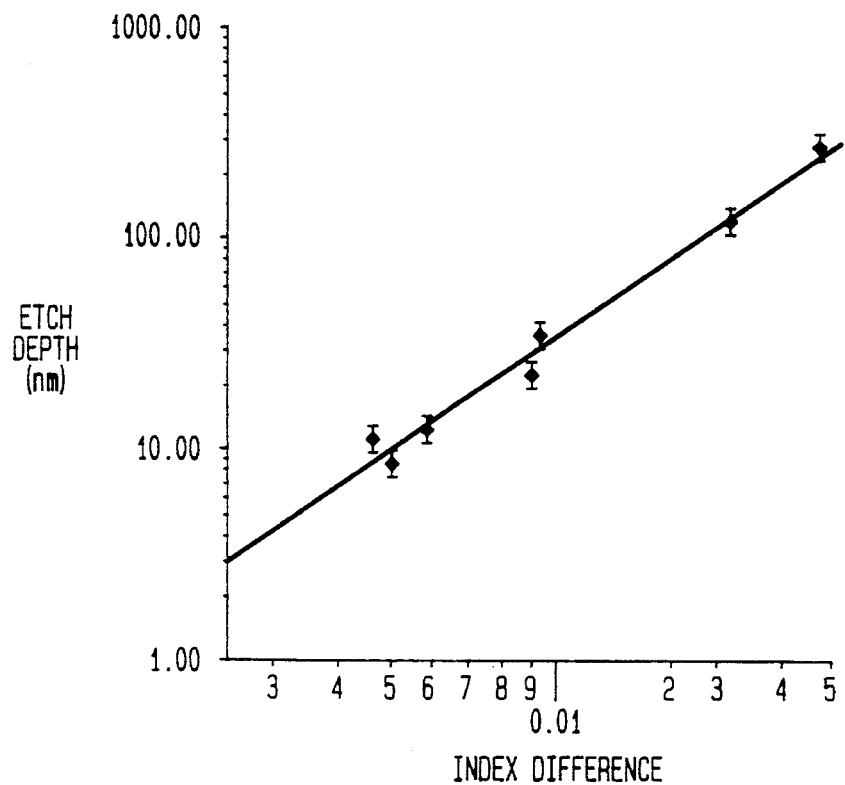
FIG. 20 shows the correlation for a germanium-induced index change.

The correlation for a germanium-induced index change is shown in FIG. 20. It should be noticed that independent of processing conditions, stress states, and other differences in various fibers, this correlation holds for all fibers as long as they are germanosilicates. This allows a direct estimate of the index change based on the topographical change of the etched surface for germanosilicate fibers.

In accordance with the present invention, the advantages of characterizing the index change based on a scanning probe microscope analysis of the etched endface are twofold.

First, an atomic force microscope has a spatial resolution of subnanometers on both horizontal and vertical scales. This is particularly useful in identifying structural and index changes within a small core. The distinction of each deposited layer structure and its associated index change is virtually not limited by the instrumental resolution.

Second, a surface topography is a 3-D rendering of the etching depth. By correlating the etching depth with the index change, a 3-D mapping of the structural as well as index change can be obtained in one experiment. This is particularly useful in identifying anisotropy in the index change or structural inhomogeneity that may be associated with the light guiding structure. The examples illustrate the capability to correlate the microstructural features with the index change, not only on preforms, but particularly on fibers, with superior resolution.

The present invention as described above not only provides a method for controlling polarization properties of photo-induced devices such as ultravioletly induced gratings, but also provides a powerful technique to study the light guiding structure of optical waveguides. Until the present invention, there was no known method to control the birefringence induced from writing photo-induced devices.

The use of a scanning probe microscope, together with the cleaving and etching of the optical waveguide endface provides superior resolution with a local probe. With judicious choice of etchants, the light guiding structure (both the core and cladding) of optical waveguides can be enhanced via topography. The different light guiding structure which results from either the chemistry or the processing can be identified through the differential etching rate. The structure of the core and the geometrical distortions can be determined directly from the profile topography. A 3-D mapping of the refractive index change can also be made by establishing a correlation between the infractive index change and the etching topography.

It should be understood that the foregoing description of the invention is intended merely to be illustrative thereof, and that other embodiments, modifications and equivalents made be apparent to those skilled in the art without departing from its spirit.

That which is claimed is:

1. A method of investigating the structure of a light guiding body comprising the steps of cleaving an elongated light guiding body, including a core and a cladding, to expose its cross section, treating the cleaved section to expose differences between the core and the cladding, and profiling the cross section of the treated elongated body with a scanning probe microscope to investigate the structure of the light guiding body.

2. The method according to claim 1 wherein the step of treating includes etching the cleaved end of the waveguide in an acid.

3. The method according to claim 1 wherein the step of treating includes etching the cleaved end of the waveguide in a base.

4. The method according to claim 1 wherein the waveguide is an optical fiber.

5. The method according to claim 1 wherein the waveguide is a planar waveguide.

6. A method of determining the structure of a photo-induced device contained within an optical waveguide comprising the steps of cleaving the optical waveguide at the location of the device to form a cleaved endface, etching the cleaved endface of the optical waveguide, measuring the etched profile at the endface with a scanning probe microscope to determine the difference in profile, and determining the structure across the endface of the device based on the measured profile differences.

7. The method according to claim 6 including the step of forming the device by exposing the waveguide to ultraviolet light to form gratings.

8. The method according to claim 6 including etching the cleaved end of the waveguide in an acid.

9. The method according to claim 6 including etching the cleaved end of the waveguide in a base.

10. The method according to claim 6 including forming a spatial mapping of the endface by quantifying the etched depth in relation to the refractive index change.

11. The method according to claim 6 wherein the optical waveguide includes a fiber core and including the step of determining the geometrical distortion of the fiber core including ovality.

12. The method according to claim 6 wherein the optical waveguide includes a fiber core and including the step of determining the diameter of the fiber core.

13. The method according to claim 6 wherein the optical waveguide comprises an optical fiber having a germanosilicate core.

14. The method according to claim 10 including the step of determining any changes in the refraction index of the device by correlating the profile height with values of refractive index.

* * * * *